(12) United States Patent
Chai et al.

(10) Patent No.: US 12,649,630 B2
(45) Date of Patent: Jun. 9, 2026

(54) APPARATUS FOR QUALITY GRADING, SORTING AND CONVEYING CUCUMBERS, AND DYNAMIC SEPARATION IMPLEMENTATION METHOD

(71) Applicant: AGRICULTURAL INFORMATION INSTITUTE OF CHINESE ACADEMY OF AGRICULTURAL SCIENCE, Beijing (CN)

(72) Inventors: Xiujuan Chai, Beijing (CN); Xiangpeng Fan, Beijing (CN); Ning Zhang, Beijing (CN); Qixin Sun, Beijing (CN); Wenrong Zhang, Beijing (CN); Tan Sun, Beijing (CN)

(73) Assignee: AGRICULTURAL INFORMATION INSTITUTE OF CHINESE ACADEMY OF AGRICULTRAL SCIENCE, Beijing (CN)

( * ) Notice: Subject to any disclaimer, the term of this patent is extended or adjusted under 35 U.S.C. 154(b) by 88 days.

(21) Appl. No.: 18/863,114

(22) PCT Filed: Jun. 21, 2023

(86) PCT No.: PCT/CN2023/101736
§ 371 (c)(1),
(2) Date: Nov. 5, 2024

(87) PCT Pub. No.: WO2024/109008
PCT Pub. Date: May 30, 2024

(65) Prior Publication Data
US 2025/0289666 A1 Sep. 18, 2025

(30) Foreign Application Priority Data
Nov. 21, 2022 (WO) ................ PCT/CN2022/133104

(51) Int. Cl.
B65G 15/58 (2006.01)
B07C 5/36 (2006.01)

(52) U.S. Cl.
CPC ................ B65G 15/58 (2013.01); B07C 5/36 (2013.01); *B07C 2501/009* (2013.01); *B65G 2201/0211* (2013.01)

(58) Field of Classification Search
CPC ........... B65G 15/58; B65G 2201/0211; B07C 2501/009; B07C 5/36
(Continued)

(56) References Cited

U.S. PATENT DOCUMENTS 5,267,654 A * 12/1993 Leverett ............... B65G 47/965
209/912
2018/0169708 A1* 6/2018 Nijland ..................... B07C 5/16

FOREIGN PATENT DOCUMENTS

CN 111069094 A 4/2020
CN 211051952 U 7/2020
(Continued)

OTHER PUBLICATIONS

JP H09327667 (Year: 1997).*
JP 2022511182 (Year: 2019).*
CA2639440 (Year: 2008).*

*Primary Examiner* — Gene O Crawford
*Assistant Examiner* — Lester Rushin, III
(74) *Attorney, Agent, or Firm* — WCF IP

(57) ABSTRACT

An apparatus and a method for quality grading, sorting, and conveying cucumbers are provided. The method includes: driving a multi-groove bearing tray with a cucumber placed at the top by a chain rod conveying mechanism to reach a strip-shaped belt conveying mechanism, where each of gaps between every two adjacent arc-shaped grooves of the multi-groove bearing tray is larger than a width of a corresponding one of the strip-shaped conveying belt branches, (Continued)

the multi-groove bearing tray overlaps with the strip-shaped belt conveying mechanism, and the cucumber at the top of the multi-groove bearing tray is higher than the strip-shaped conveying belt branches; and decreasing a distance between the cucumber placed at the top of the multi-groove bearing tray and the strip-shaped conveying belt branches continuously until the bottom of the cucumber is in contact with the strip-shaped conveying belt branches.

20 Claims, 3 Drawing Sheets

(58) Field of Classification Search
USPC ......................................................... 198/617
See application file for complete search history.

(56) References Cited

FOREIGN PATENT DOCUMENTS

| | | | |
|---|---|---|---|
| CN | 212150827 | U | 12/2020 |
| CN | 115815135 | A | 3/2023 |
| EP | 1 260 468 | A2 | 11/2002 |
| JP | H07-89517 | A | 4/1995 |
| JP | H08-175653 | A | 7/1996 |

* cited by examiner

APPARATUS FOR QUALITY GRADING, SORTING AND CONVEYING CUCUMBERS, AND DYNAMIC SEPARATION IMPLEMENTATION METHOD

CROSS REFERENCE TO RELATED APPLICATION

This application is a national stage application of International Patent Application No. PCT/CN2023/101736, filed on Jun. 21, 2023, which claims the priority of Chinese Patent Application No. PCT/CN2022/133104 entitled "APPARATUS FOR QUALITY GRADING, SORTING AND CONVEYING CUCUMBERS, AND DYNAMIC SEPARATION IMPLEMENTATION METHOD AND SYSTEM" filed with the Chinese Patent Office on Nov. 21, 2022, which is incorporated herein by reference in its entirety.

TECHNICAL FIELD

The present disclosure relate to the field of grading and sorting fruits and vegetables, in particular to a key apparatus for grading and sorting cucumbers efficiently and nondestructively and a production process thereof.

BACKGROUND

The current mechanization level of producing cucumbers is low, and the equipment system is imperfect. In the harvesting, post-harvest sorting and processing links, manual labor accounts for more than 60%, which is not only high in labor cost but also low in sorting efficiency. After large quantities of cucumbers are harvested, the cucumbers are not graded in time according to corresponding indicators, and the maximum economic benefits cannot be obtained, which restricts the sustainable production of the cucumber industry. Rapid quality control and intelligent grading of cucumbers based on external characteristics can greatly reduce the workload of workers, significantly increase the added value of agricultural products, and improve the efficiency and quality of agricultural production. Cucumber belongs to the typical long and irregular fruit and vegetable, which are technically difficult to convey and separate. The existing technology for grading and sorting fruits and vegetables is insufficient, and the grading effect is poor. A large-scale grading and sorting apparatus for cucumbers has not yet appeared on the market.

Currently, there are only bearing trays and conveying and separating apparatuses for grading fruits and vegetables that resemble circular shapes. The objects to be loaded and conveyed are only regular fruits and vegetables that resemble circular shapes, such as tomatoes, round eggplants, apples and oranges. Therefore, most of the bearing apparatuses are designed as regular circles or squares. However, cucumbers belong to long and irregular fruits and vegetables, such that the circular or square bearing apparatuses cannot meet the basic requirements for conveying cucumbers. There is no relevant technical report on the bearing apparatus for dynamically conveying long and irregular fruits and vegetables such as cucumbers. In addition, the current circular trays often require manual operation or the driving assistance of mechanical components such as a turnover mechanism and a push-pull rod mechanism in the process of conveying and separating fruits and vegetables, which will not only affect the separation efficiency after automatically grading and sorting fruits and vegetables, but also inevitably result in certain mechanical damages to fruits and vegetables and affect the external quality of fruits and vegetables. To sum up, the prior art has the following technical problems.

1. The bearing apparatus is the key component to move, convey, grade and sort fruits and vegetables. The bearing apparatus designed for regular fruits and vegetables in the past is limited to only a few objects, which can only load and convey fruits and vegetables that resemble circular shapes, but is not suitable for irregular fruits and vegetables such as cucumbers.

2. Dynamically conveying and separating fruits and vegetables after being sorted is one of the key links in sorting and packaging. In the past, fruits and vegetables need to be separated from the bearing tray by turning over the mechanism or by the mechanical driving thrust. Although this method can achieve the purpose of separation, it is easy to result in mechanical damages of the fruits and vegetables and reduce the quality of fruit and vegetable products.

At present, there is no grading and sorting production line and complete set of equipment for irregular fruits and vegetables such as cucumbers, which seriously limits the production demand for large-scale and industrial grading of cucumbers. Therefore, it is urgent to develop a key apparatus and method of grading and sorting cucumbers in a large scale after harvest to make up for the shortage of the rapid quality control and nondestructively sorting market for cucumbers.

SUMMARY

In order to solve the problems that it is easy to damage cucumbers and the sorting efficiency is low in the conveying and dynamically separating process after online quality grading and intelligent sorting of cucumbers, the present disclosure invented a multi-groove bearing apparatus suitable for grading and sorting irregular fruits and vegetables such as cucumbers, as well as a dynamic conveying and separation structure and an implementation method based on the needs and difficulties of rapid quality grading and sorting of cucumbers. The present disclosure mainly includes the following contents: a) a multi-groove bearing tray apparatus suitable for dynamically conveying irregular fruits and vegetables such as cucumbers is designed; and b) a rapid nondestructive separation structure in the process of grading, sorting and dynamically conveying cucumbers and an implementation method are designed.

Aiming at the disadvantages of the prior art, the present disclosure provides an apparatus for quality grading, sorting and conveying cucumbers, where the apparatus includes:

multi-groove bearing trays (10), which are configured to load and carry cucumbers (9) to be conveyed in a production line, where multiple arc-shaped grooves are provided at a top of each of the multi-groove bearing trays (10) for loading the cucumbers (9), and multiple inverted U-shaped grooves are provided at a bottom of each of the multi-groove bearing trays (10);

a chain rod conveying mechanism (37), which is provided with chain rod conveying supporting shafts (22) which cooperate with the multiple inverted U-shaped grooves at the bottom of each of the multi-groove bearing trays (10) to convey the cucumbers in a mobile manner in cooperation with each of the multi-groove bearing trays (10);

a strip-shaped belt conveying mechanism (36), which is provided with multiple strip-shaped conveying belt branches which cooperate with the multiple arc-shaped grooves of each of the multi-groove bearing trays (10), where the multiple strip-shaped conveying belt branches are configured to support the cucumbers (9), and to convey and separate the cucumbers (9) to the top of each of the multi-groove bearing trays (10); and the strip-shaped belt conveying mechanism (36) is arranged above the chain rod conveying mechanism (37);

where the chain rod conveying mechanism (37) includes three levels of conveying channels which are an upper conveying channel, an inclined conveying channel and a lower conveying channel, the three levels of conveying channels are in an uninterrupted connection form, and the inclined conveying channel is convenient to form a height difference, such that a height of the bearing tray is lowered as a position of the chain rod conveying supporting shaft moves.

According to the apparatus for quality grading, sorting and conveying cucumbers, the each of the multi-groove bearing trays (10) is provided with seven bearing tray vertical plates (2), an arc-shaped groove is provided at a top of each of the seven bearing tray vertical plates (2), and seven arc-shaped grooves include a first arc-shaped groove (1), a second arc-shaped groove (3), a third arc-shaped groove (4), a fourth arc-shaped groove (5), a fifth arc-shaped groove (6), a sixth arc-shaped groove (7), and a seventh arc-shaped groove (8); six longitudinal square grooves formed between the seven bearing tray vertical plates include a first longitudinal square groove (14), a second longitudinal square groove (15), a third longitudinal square groove (16), a fourth longitudinal square groove (17), a fifth longitudinal square groove (18) and a sixth longitudinal square groove (19).

According to the apparatus for quality grading, sorting and conveying cucumbers, the multiple arc-shaped grooves are respectively located above the seven bearing tray vertical plates (2) and are distributed symmetrically on left and right; the first arc-shaped groove (1) and the seventh arc-shaped groove (8) of each of the multi-groove bearing trays (10) have a same groove depth and a same groove width, the second arc-shaped groove (3) and the sixth arc-shaped groove (7) have a same groove depth and a same groove width, the third arc-shaped groove (4), the fourth arc-shaped groove (5) and the fifth arc-shaped groove (6) have a same groove depth and a same groove width, and widths of the multiple arc-shaped grooves increase gradually from a middle to both sides of each of the multi-groove bearing trays except that the third arc-shaped groove (4), the fourth arc-shaped groove (5) and the fifth arc-shaped groove (6) have a same groove width.

According to the apparatus for quality grading, sorting and conveying cucumbers, spacing between every two adjacent longitudinal square grooves of the six longitudinal square grooves are same; three inverted U-shaped grooves are provided at the bottom of each of the multi-groove bearing trays (10), which are a first inverted U-shaped groove (11), a second inverted U-shaped groove (12) and a third inverted U-shaped groove (13), and a direction of the inverted U-shaped grooves is perpendicular to a direction of the six longitudinal square grooves.

According to the apparatus for quality grading, sorting and conveying cucumbers, the chain rod conveying mechanism (37) is provided with the chain rod conveying supporting shafts (22), chain rollers (38), chain inner plates (39), chain pins (40) and chain outer plates (41), a supporting frame (34) is mounted below the chain rod conveying mechanism, and a left protective shell (20) above the chain rod conveying mechanism and a right inclined protective shell (33) of the chain rod conveying mechanism and are mounted on a left side of the chain rod conveying mechanism, and a right protective shell (21) above the chain rod conveying mechanism and a right inclined protective shell (23) of the chain rod conveying mechanism are mounted on a right side of the chain rod conveying mechanism.

According to the apparatus for quality grading, sorting and conveying cucumbers, each of the chain rod conveying supporting shafts (22) is connected with a corresponding one of the chain rollers (38), a corresponding one of the chain inner plates (39) and a corresponding one of the chain outer plate (41) via an inner sleeve.

Each of the chain rod conveying supporting shafts (22) of the chain rod conveying mechanism (37) is a hollow round bar made of stainless steel, gaps between every two adjacent chain rod conveying supporting shafts of the chain rod conveying supporting shafts (22) are same, and the chain rod conveying supporting shafts (22) cooperate with the first inverted U-shaped groove (11), the second inverted U-shaped groove (12) and the third inverted U-shaped groove (13) of each of the multi-groove bearing trays (10) and fix the multi-groove bearing trays (10) above the chain rod conveying mechanism (37).

According to the apparatus for quality grading, sorting and conveying cucumbers, the multiple strip-shaped conveying belt branches of the strip-shaped belt conveying mechanism (36) include a first strip-shaped conveying belt branch (24), a second strip-shaped conveying belt branch (25), a third strip-shaped conveying belt branch (26), a fourth strip-shaped conveying belt branch (27), a fifth strip-shaped conveying belt branch (28) and a sixth strip-shaped conveying belt branch (29); and the first strip-shaped conveying belt branch (24), the second strip-shaped conveying belt branch (25), the third strip-shaped conveying belt branch (26), the fourth strip-shaped conveying belt branch (27), the fifth strip-shaped conveying belt branch (28) and the sixth strip-shaped conveying belt branch (29) have a same size and are evenly distributed.

According to the apparatus for quality grading, sorting and conveying cucumbers, the strip-shaped belt conveying mechanism (36) and the chain rod conveying mechanism (37) are kept in a parallel state, a height of the strip-shaped belt conveying mechanism (36) is higher than the lower conveying channel, the inclined conveying channel and the upper conveying channel of the chain rod conveying mechanism (37), and the height of the strip-shaped belt conveying mechanism (36) away from the lower conveying channel is higher than the height of the strip-shaped belt conveying mechanism (36) away from the upper conveying channel.

A belt width of each of the strip-shaped conveying belt branches is smaller than a width of each of the six longitudinal square grooves of each of the multi-groove bearing trays (10).

According to the apparatus for quality grading, sorting and conveying cucumbers, both the chain rod conveying mechanism (37) and the strip-shaped belt conveying mechanism (36) independently control the conveying speed through an external Programmable Logic Controller (PLC) and a frequency converter, and in a conveying control process, a conveying speed of the strip-shaped belt conveying mechanism (36) is less than or equal to a conveying speed of the chain rod conveying mechanism (37).

The present disclosure further provides a method of adopting the apparatus for quality grading, sorting and conveying cucumbers described above, including:

driving one of the multi-groove bearing trays (10) with the cucumbers (9) placed at the top by the chain rod conveying mechanism (37) to reach the strip-shaped belt conveying mechanism (36), where each of gaps between every two adjacent arc-shaped grooves of the multiple arc-shaped grooves of each of the multi-groove bearing trays (10) is larger than a width of a corresponding one of the strip-shaped conveying belt branches, the one of the multi-groove bearing trays (10) overlaps with the strip-shaped belt conveying mechanism (36), and the cucumbers (9) placed at the top of the one of the multi-groove bearing trays (10) are higher than the strip-shaped conveying belt branches; and decreasing a distance between the cucumbers (9) placed at the top of the one the multi-groove bearing trays (10) and the strip-shaped conveying belt branches continuously until bottoms of the cucumbers (9) are in contact with the strip-shaped conveying belt branches when the one of the multi-groove bearing trays (10) is driven by an inclined channel of the chain rod conveying mechanism (37), transferring the cucumbers (9) from the multi-groove bearing trays (10) to the strip-shaped belt conveying mechanism (36), and driving the one of the multi-groove bearing trays (10) by the inclined conveying channel of the chain rod conveying mechanism (37) to be continuously lowered until the multiple arc-shaped grooves and the strip-shaped conveying belt branches are separated from each other.

As can be seen from the above solution, the embodiments have the following advantages.

The embodiments are an important apparatus for conveying and dynamically separating targets in the process of large-scale grading and sorting operation of cucumbers and a technical implementation method. The embodiments focus on solving the problems of complex implementation, low efficiency and great damage of the conveying and dynamically separating technology of a production line after grading of cucumbers. The embodiments design a bionic bearing tray with a multi-groove structure, which conforms to the appearance characteristics of irregular fruits and vegetables such as cucumbers and can nondestructively separate and convey cucumbers in a high-speed moving state. The embodiments provide a cucumber dynamic conveying and separating method combining chain rod conveying mechanisms and a strip-shaped conveying mechanism. The conveying mechanisms with different heights and different speeds are provided, such that cucumbers can be naturally separated in the dynamic conveying process without assistance, such as pushing, pulling and turning over, which greatly improves the conveying and separation efficiency, and reduces the mechanical damage of cucumbers resulted from friction or external forces. The apparatus designed by the embodiments and the proposed method have good application potential and popularization prospect in the large-scale grading and sorting production process of cucumbers after harvest.

Figures 1, 2:
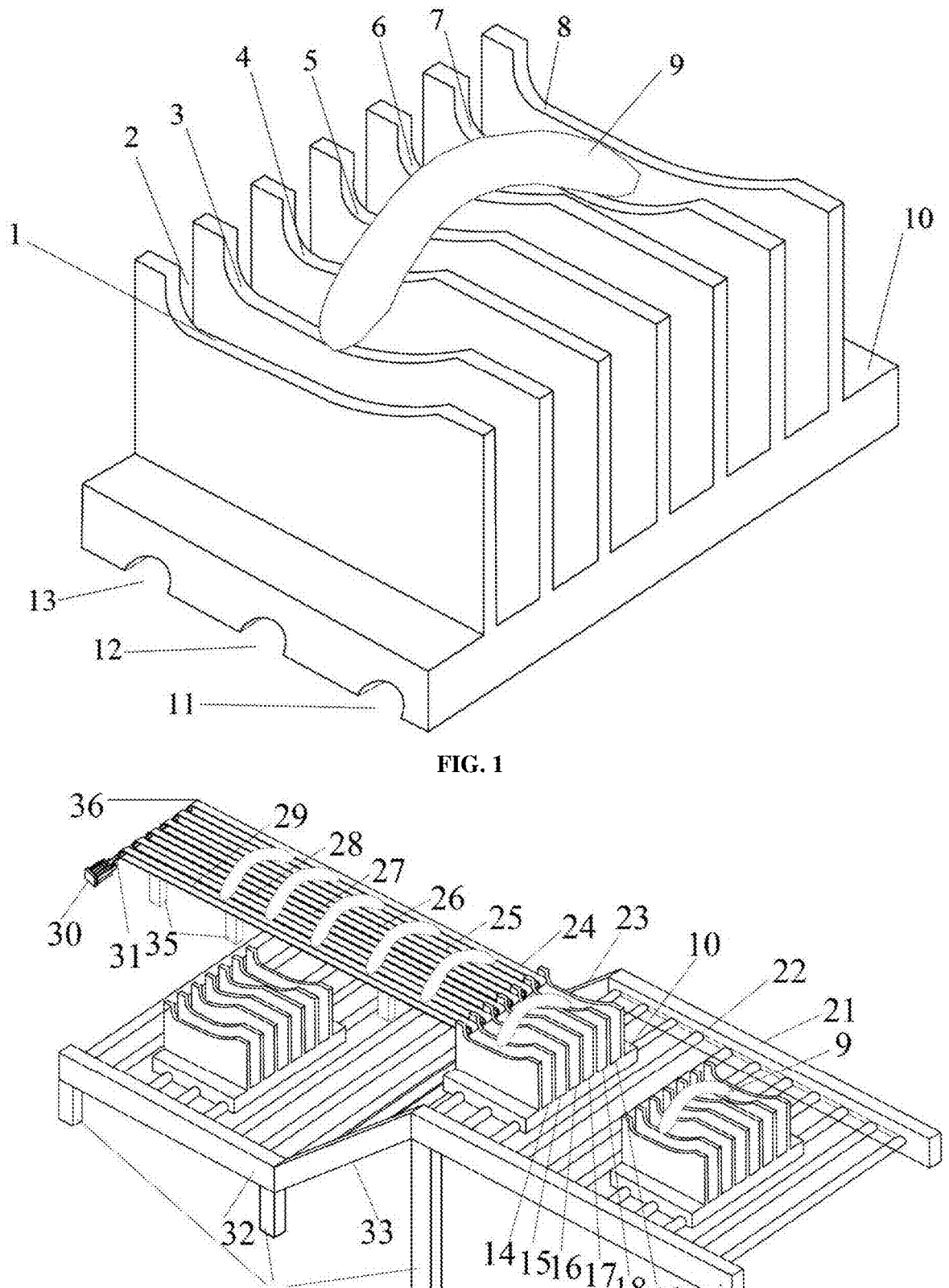
FIG. 1 is a schematic diagram of irregular multi-groove bearing tray and cucumber loading according to the present disclosure.
FIG. 2 is an overall schematic diagram of an apparatus for conveying and dynamically separating cucumbers according to the present disclosure.
Figure 3:
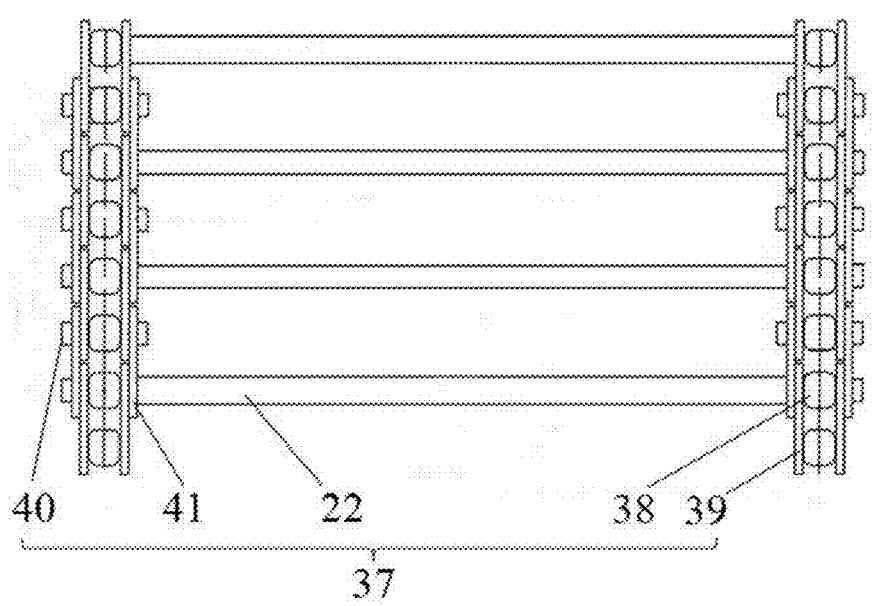
FIG. 3 is a schematic diagram of a chain rod conveying mechanism according to the present disclosure.
Figure 4:
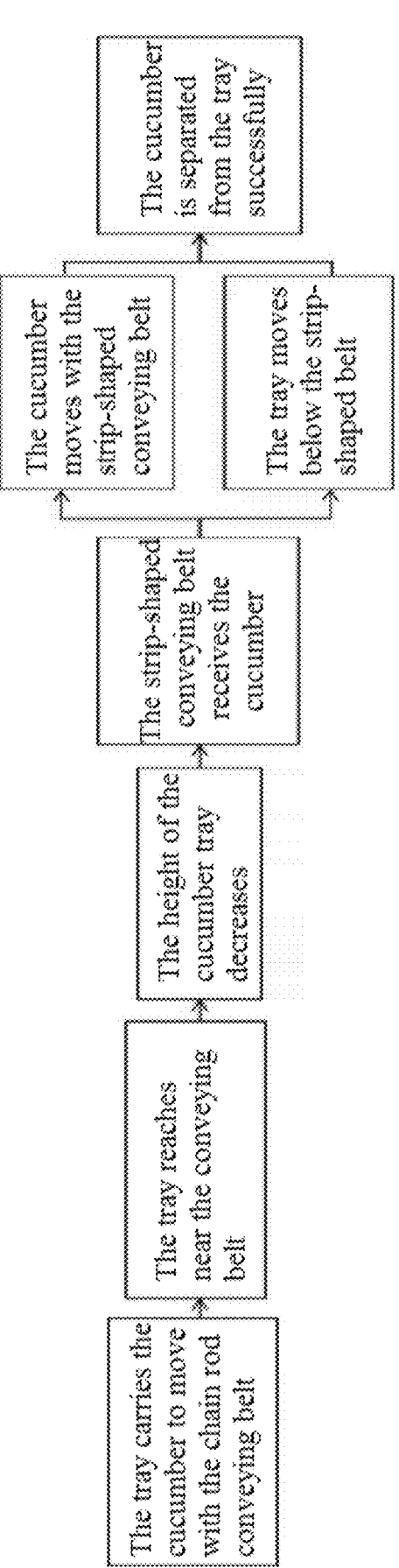
FIG. 4 is a flow chart of dynamic conveying and separation of cucumbers according to the present disclosure.

LIST OF THE REFERENCE CHARACTERS 1 first arc-shaped groove of multi-groove bearing tray; 2 multi-groove bearing tray vertical plate; 3 second arc-shaped groove of multi-groove bearing tray; 4 third arc-shaped groove of multi-groove bearing tray; 5 fourth arc-shaped groove of multi-groove bearing tray; 6 fifth arc-shaped groove of multi-groove bearing tray; 7 sixth arc-shaped groove of multi-groove bearing tray; 8 seventh arc-shaped groove of multi-groove bearing tray; 9 cucumber; 10 multi-groove bearing tray; 11 first inverted U-shaped groove of multi-groove bearing tray; 12 second inverted U-shaped groove of multi-groove bearing tray; 13 third inverted U-shaped groove of multi-groove bearing tray; 14 first longitudinal square groove of multi-groove bearing tray; 15 second longitudinal square groove of multi-groove bearing tray; 16 third longitudinal square groove of multi-groove bearing tray; 17 fourth longitudinal square groove of multi-groove bearing tray; 18 fifth longitudinal square groove of multi-groove bearing tray; 19 sixth longitudinal square groove of multi-groove bearing tray; 20 left protective shell above chain rod conveying mechanism; 21 right protective shell above chain rod conveying mechanism; 22 chain rod conveying supporting shaft; 23 right inclined protective shell of chain rod conveying mechanism; 24 first strip-shaped conveying belt branch; 25 second strip-shaped conveying belt branch; 26 third strip-shaped conveying belt branch; 27 fourth strip-shaped conveying belt branch; 28 fifth strip-shaped conveying belt branch; 29 sixth strip-shaped conveying belt branch; 30 strip-shaped conveying belt motor; 31 motor drive shaft; 32 left protective shell below chain rod conveying apparatus; 33 left inclined protective shell of chain rod conveying apparatus; 34 chain rod conveying mechanism supporting frame; 35 strip-shaped conveying belt supporting frame; 36 strip-shaped belt conveying mechanism; 37 chain rod conveying mechanism; 38 chain roller; 39 chain inner plate; 40 chain pin; and 41 chain outer plate

DETAILED DESCRIPTION OF THE EMBODIMENTS

Aiming at the disadvantages of the prior art, the present disclosure provides an apparatus for conveying and dynamically separating cucumbers through multi-groove bearing trays and conveying mechanisms and an implementation method. The multi-groove bearing tray is designed in the form of a combination of multi-curved grooves and longitudinal square grooves. Based on bionics, the characteristics of the designed multi-curved grooves are adapted to the irregular appearance of the cucumber, which effectively ensures that the tray conveys the cucumber stably. The conveying mechanism is classified into a chain rod conveying mechanism at the upper level and a strip-shaped belt conveying mechanism at the lower level. The chain rod conveying mechanism has the characteristic of stable operation, and can achieve the purpose of long-distance and variable-height conveying. The chain rod conveying supporting shafts of the chain rod conveying mechanism cooperates with the U-shaped grooves at the bottom of the multi-groove bearing tray to convey the bearing tray and cucumbers. The structure of the strip-shaped conveying belts is adapted to the longitudinal square groove of the cucumber bearing apparatus. When the chain rod conveying mechanism and the strip-shaped belt conveying mechanism operate in the same direction, multiple branches of the strip-shaped conveying belts are inserted into multiple longitudinal square grooves of the tray, respectively, to hold up the the cucumber. The tray is separated from the cucumber under the action of relative movement and height difference. According to the embodiments, mechanical damage (injury) resulted from high-speed conveying of cucumbers after being graded and sorted can be minimized. The dynamic separation efficiency of cucumbers in the process of grading, sorting and conveying cucumbers at a high speed can be improved. The problems that the movement characteristics of grading and sorting irregular fruits and vegetables are poor, and the quality detecting, grading and sorting efficiency is low can be effectively solved.

In order to make the above-mentioned features and effects of the present disclosure more clear and understandable, the following examples are given in detail with reference to the accompanying drawings in the specification.

In order to achieve the above effects, the technical solution adopted by the present disclosure includes an apparatus for quality grading, sorting and conveying cucumbers and a dynamic separation implementation method. The apparatus for quality grading, sorting and conveying cucumbers include multi-groove bearing trays, a chain rod conveying mechanism and a strip-shaped belt conveying mechanism. The multi-groove bearing tray is configured to load and carry the graded cucumber.

The chain rod conveying mechanism is configured to arrange and convey the bearing trays. The upper conveying channels of the chain rod conveying mechanism are provided at the front end of the strip-shaped conveying belts to arrange and convey the bearing trays loaded with cucumbers. The inclined conveying channels and the lower conveying channel of the chain rod conveying mechanism are provided at the lower position of the strip-shaped conveying belts to arrange and convey the unloaded trays.

The strip-shaped conveying belts are configured to arrange and convey the graded cucumbers. The strip-shaped belt conveying mechanism is located above the chain rod conveying mechanism. When the cucumber bearing tray moves in the upper conveying channel of the chain rod conveying mechanism, the position where the lower layer of the strip-shaped conveying belt is located is higher than the bottom height of the longitudinal square groove of the bearing tray, and the height of the upper layer of the strip-shaped conveying belt is lower than the bottom height of any arc-shaped groove of the bearing tray.

As a preferred solution of the present disclosure, the multi-groove bearing tray has structural types such as arc-shaped grooves, longitudinal square grooves, inverted U-shaped grooves at the bottom of the multi-groove bearing tray. The arc-shaped grooves are located above the bearing tray vertical plate, including a first arc-shaped groove, a second arc-shaped groove, a third arc-shaped groove, a fourth arc-shaped groove, a fifth arc-shaped groove, a sixth arc-shaped groove and a seventh arc-shaped groove, respectively, from left to right. The width of the first arc-shaped groove and the width of the seventh arc-shaped groove are the maximum, followed by the width of the second arc-shaped groove and the width of the sixth arc-shaped groove, and the width of the third arc-shaped groove, the width of the fourth arc-shaped groove and the width of the fifth arc-shaped groove are the minimum. The purpose is to adapt to the irregular shapes of cucumbers and ensure stability in the loading process.

As a preferred solution of the present disclosure, the arc-shaped groove and the bottom inverted U-shaped groove of the multi-groove bearing tray are perpendicular to the longitudinal square groove. The arc-shaped groove is more adjacent to the front side of the tray vertical plate. The groove spacing of the bearing tray is equal to each other.

As a preferred solution of the present disclosure, the depth of the second arc-shaped groove, the depth of the third arc-shaped groove, the depth of the fourth arc-shaped groove, the depth of the fifth arc-shaped groove and the depth of the sixth arc-shaped groove of the multi-groove bearing tray are slightly lower than the depth of the first arc-shaped groove and the depth of the seventh arc-shaped groove. The distance formed by the second arc-shaped groove, the third arc-shaped groove, the fourth arc-shaped groove, the fifth arc-shaped groove and the sixth arc-shaped groove is slightly longer than the length of the cucumber, so as to ensure that the entire cucumber is in the second arc-shaped groove to the sixth arc-shaped groove without slipping out when the cucumber is loaded.

As a preferred solution of the present disclosure, the bearing tray is made of Thermoplastic polyurethanes (TPU), which is environment-friendly, pollution-free, excellent in recyclability, wear-resistant, impact-resistant, and shock-absorbent without wearing fruit and vegetable targets such as cucumbers.

As a preferred solution of the present disclosure, both sides of the chain rod conveying mechanism are provided with thickened protective shells, which not only can play the role of fixing chains, chain rods and the like, but also protect the life safety and ensure the safe operation of the conveying mechanism.

As a preferred solution of the present disclosure, the chain rod conveying mechanism adopts a solution of combining chains and chain rod supporting shafts. The chain rod is a round bar made of stainless steel. Multiple conveying supporting shafts are arranged in a dense chain net structure. The distances between every two adjacent chain rod supporting shafts is same, which are the same as the spacing between every two adjacent inverted U-shaped grooves below the bearing tray. The chain rod supporting shafts cooperate with the inverted U-shaped grooves to move the bearing tray. When the bearing tray moves in the upper conveying channel of the chain rod conveying mechanism, the U-shaped grooves of the bearing tray are slightly higher than the strip-shaped conveying belts. At this time, the cucumbers are just above the strip-shaped conveying belts.

As a preferred solution of the present disclosure, the inclination angle of the inclined channel of the chain rod conveying mechanism can be set between 20 degrees and 45 degrees according to different conveying speed requirements. When the bearing tray moves to the inclined channel with the chain rod conveying mechanism, the bearing tray can move obliquely and downwards with the chain rod supporting shafts smoothly. The cucumber moves with the strip-shaped conveying belts without being in contact with the bearing tray, thus separating the cucumber from the tray. When the bearing tray moves in the lower channel of the chain rod conveying mechanism, the bearing tray is completely placed under the strip-shaped conveying belts without contact, moves with the chain rod conveying mechanism and reaches the recovery position of the tray.

As a preferred solution of the present disclosure, five belt branches of the strip-shaped conveying belts are provided.

The spacing between every two adjacent branches are equal to each other. The width of the strip-shaped conveying belt is slightly smaller than the width of the longitudinal square groove of the bearing tray, which is convenient for the strip-shaped conveying belts to enter the longitudinal square grooves of the bearing tray and hold up the cucumbers, so as to separate the cucumber from the tray.

As a preferred solution of the present disclosure, the strip-shaped conveying belt is made of silica gel, which has excellent electrical insulation performance, aging resistance, chemical stability, oxidation resistance and weather resistance. Since the silica gel is soft, it will not result in frictional mechanical damage of cucumbers, thus ensuring the quality of cucumbers.

As a preferred solution of the present disclosure, both the chain rod conveying mechanism and the strip-shaped belt conveying mechanism independently control the conveying speed through an external Programmable Logic Controller (PLC) and a frequency converter. In the conveying control process, the maximum conveying speed of the strip-shaped conveying belt is does not exceed that of the chain rod conveying mechanism.

The present disclosure provides an apparatus for quality grading, sorting and conveying cucumbers and a dynamic separation implementation method. The structure and implementation flow of the apparatus are shown in FIG. 1 to FIG. 4, and the specific implementation process is as follows.

After the cucumbers are graded in a non-destructive manner such as vision, the cucumbers are carried by the irregular multi-groove bearing tray shown in FIG. 1 and moves and are conveyed on the chain rod conveying mechanism. The strip-shaped conveying belt rotates in the same direction, but the moving speed of the strip-shaped conveying belt is slightly lower than that of the chain rod conveying mechanism, so as to separate the graded cucumbers from the bearing apparatus and enter the subsequent processing link.

When the multi-groove bearing tray reaches the position of the strip-shaped conveying belts, the strip-shaped conveying belts enter through the longitudinal square grooves of the multi-groove bearing tray. The cucumbers are in contact with the strip-shaped conveying belts, and the bearing tray gradually inclines downwards. With the further movement, since the moving speed of the chain rod conveying mechanism is higher than that of the strip-shaped conveying belt, the cucumbers are completely separated from the bearing tray. After that, the cucumbers continue to move along with the strip-shaped conveying belts until the subsequent packaging process. The bearing tray is recycled and refluxed in the lower conveying channel of the chain rod conveying mechanism, so as to convey the cucumbers in a mobile manner and dynamically separate the cucumbers after the cucumbers are graded.

To sum up, the present disclosure provides a multi-groove bearing tray suitable for long and irregular fruits and vegetables. Based on bionics, the characteristics of the designed multi-curved grooves adapt to the appearance of cucumbers, and the unique multi-groove structure and the special materials greatly enhance the conveying efficiency of cucumbers and ensure the quality of the cucumbers. According to the embodiments, the idea that the chain rod conveying mechanism and the strip-shaped conveying belts move in the same direction at different speeds is adopted, such that the cucumber is separated from the tray in the moving process under the action of the inclined conveying channel and the height difference, and the mechanical damage resulted from the separation driven by external forces is avoided. According to different cucumber varieties, the embodiments can adjust the relative position and the movement speed of the conveying mechanism, and realize the key apparatus and technical requirements of the large-scale grading and sorting operation of multiple cucumber varieties. The present disclosure is simple in structure, low in cost, and suitable for popularization and application in a large-scale grading and sorting production line.

Industrial Applicability

The present disclosure provides an apparatus and a method for quality grading, sorting and conveying cucumbers. The method includes the following steps: a multi-groove bearing tray with a cucumber placed at the top is driven by a chain rod conveying mechanism to reach a strip-shaped belt conveying mechanism, each of gaps between every two adjacent arc-shaped grooves of the multiple arc-shaped grooves of each of the multi-groove bearing trays is larger than a width of a corresponding one of the strip-shaped conveying belt branches, the multi-groove bearing tray overlaps with the strip-shaped belt conveying mechanism, and the cucumber placed at the top of the multi-groove bearing tray is higher than the strip-shaped conveying belt branches; when the multi-groove bearing tray is driven by the downwards inclined chain rod conveying mechanism, a distance between the cucumber placed at the top of the multi-groove bearing tray and the strip-shaped conveying belt branches is decreased continuously until the bottom of the cucumber is in contact with the strip-shaped conveying belt branches, the cucumber is transferred from the multi-groove bearing tray to the strip-shaped belt conveying mechanism, and at this time, the multi-groove bearing tray is driven by the downwards inclined chain rod conveying mechanism to be continuously lowered until the arc-shaped grooves and the strip-shaped conveying belt branches are separated from each other. The embodiments avoid the mechanical damage resulted from separation driven by external forces in the conveying process, ensure the quality of cucumbers, and have a simple structure and low cost.

What is claimed is:

1. An apparatus for quality grading, sorting and conveying cucumbers, comprising:

multi-groove bearing trays (10), which are configured to load and carry cucumbers (9) to be conveyed in a production line, wherein a plurality of arc-shaped grooves are provided at a top of each of the multi-groove bearing trays (10) for loading the cucumbers (9), and a plurality of inverted U-shaped grooves are provided at a bottom of each of the multi-groove bearing trays (10);

a chain rod conveying mechanism (37), which is provided with chain rod conveying supporting shafts (22) which cooperate with the plurality of inverted U-shaped grooves at the bottom of each of the multi-groove bearing trays (10) to convey the cucumbers in a mobile manner in cooperation with each of the multi-groove bearing trays (10);

a strip-shaped belt conveying mechanism (36), which is provided with a plurality of strip-shaped conveying belt branches which cooperate with the plurality of arc-shaped grooves of each of the multi-groove bearing trays (10), wherein the plurality of strip-shaped conveying belt branches are configured to support the cucumbers (9), and to convey and separate the cucumbers (9) to the top of each of the multi-groove bearing trays (10); and the strip-shaped belt conveying mechanism (36) is arranged above the chain rod conveying mechanism (37);

wherein the chain rod conveying mechanism (37) comprises three levels of conveying channels which are an upper conveying channel, an inclined conveying channel and a lower conveying channel, the three levels of conveying channels are in an uninterrupted connection form, and the inclined conveying channel is convenient to form a height difference, such that a height of the bearing tray is lowered as a position of the chain rod conveying supporting shaft moves.

2. The apparatus for quality grading, sorting and conveying cucumbers according to claim 1, wherein each of the multi-groove bearing trays (10) is provided with seven bearing tray vertical plates (2), an arc-shaped groove is provided at a top of each of the seven bearing tray vertical plates (2), and seven arc-shaped grooves comprise a first arc-shaped groove (1), a second arc-shaped groove (3), a third arc-shaped groove (4), a fourth arc-shaped groove (5), a fifth arc-shaped groove (6), a sixth arc-shaped groove (7), and a seventh arc-shaped groove (8); six longitudinal square grooves formed between the seven bearing tray vertical plates comprise a first longitudinal square groove (14), a second longitudinal square groove (15), a third longitudinal square groove (16), a fourth longitudinal square groove (17), a fifth longitudinal square groove (18) and a sixth longitudinal square groove (19).

3. The apparatus for quality grading, sorting and conveying cucumbers according to claim 2, wherein the plurality of arc-shaped grooves are respectively located above the seven bearing tray vertical plates (2) and are distributed symmetrically on left and right; the first arc-shaped groove (1) and the seventh arc-shaped groove (8) of each of the multi-groove bearing trays (10) have a same groove depth and a same groove width, the second arc-shaped groove (3) and the sixth arc-shaped groove (7) have a same groove depth and a same groove width, the third arc-shaped groove (4), the fourth arc-shaped groove (5) and the fifth arc-shaped groove (6) have a same groove depth and a same groove width, and widths of the plurality of arc-shaped grooves increase gradually from a middle to both sides of each of the multi-groove bearing trays except that the third arc-shaped groove (4), the fourth arc-shaped groove (5) and the fifth arc-shaped groove (6) have a same groove width.

4. The apparatus for quality grading, sorting and conveying cucumbers according to claim 2, wherein spacing between every two adjacent longitudinal square grooves of the six longitudinal square grooves are same; three inverted U-shaped grooves are provided at the bottom of each of the multi-groove bearing trays (10), which are a first inverted U-shaped groove (11), a second inverted U-shaped groove (12) and a third inverted U-shaped groove (13), and a direction of the inverted U-shaped grooves is perpendicular to a direction of the six longitudinal square grooves.

5. The apparatus for quality grading, sorting and conveying cucumbers according to claim 1, wherein the chain rod conveying mechanism (37) is provided with the chain rod conveying supporting shafts (22), chain rollers (38), chain inner plates (39), chain pins (40) and chain outer plates (41), a supporting frame (34) is mounted below the chain rod conveying mechanism, and a left protective shell (20) above the chain rod conveying mechanism and a right inclined protective shell (33) of the chain rod conveying mechanism and are mounted on a left side of the chain rod conveying mechanism, and a right protective shell (21) above the chain rod conveying mechanism and a right inclined protective shell (23) of the chain rod conveying mechanism are mounted on a right side of the chain rod conveying mechanisma.

6. The apparatus for quality grading, sorting and conveying cucumbers according to claim 5, wherein each of the chain rod conveying supporting shafts (22) is connected with a corresponding one of the chain rollers (38), a corresponding one of the chain inner plates (39) and a corresponding one of the chain outer plate (41) via an inner sleeve;

each of the chain rod conveying supporting shafts (22) of the chain rod conveying mechanism (37) is a hollow round bar made of stainless steel, gaps between every two adjacent chain rod conveying supporting shafts of the chain rod conveying supporting shafts (22) are same, and the chain rod conveying supporting shafts (22) cooperate with the first inverted U-shaped groove (11), the second inverted U-shaped groove (12) and the third inverted U-shaped groove (13) of each of the multi-groove bearing trays (10) and fix the multi-groove bearing trays (10) above the chain rod conveying mechanism (37).

7. The apparatus for quality grading, sorting and conveying cucumbers according to claim 1, wherein the plurality of strip-shaped conveying belt branches of the strip-shaped belt conveying mechanism (36) comprise a first strip-shaped conveying belt branch (24), a second strip-shaped conveying belt branch (25), a third strip-shaped conveying belt branch (26), a fourth strip-shaped conveying belt branch (27), a fifth strip-shaped conveying belt branch (28) and a sixth strip-shaped conveying belt branch (29); and the first strip-shaped conveying belt branch (24), the second strip-shaped conveying belt branch (25), the third strip-shaped conveying belt branch (26), the fourth strip-shaped conveying belt branch (27), the fifth strip-shaped conveying belt branch (28) and the sixth strip-shaped conveying belt branch (29) have a same size and are evenly distributed.

8. The apparatus for quality grading, sorting and conveying cucumbers according to claim 2, wherein the strip-shaped belt conveying mechanism (36) and the chain rod conveying mechanism (37) are kept in a parallel state, a height of the strip-shaped belt conveying mechanism (36) is higher than the lower conveying channel, the inclined conveying channel and the upper conveying channel of the chain rod conveying mechanism (37), and the height of the strip-shaped belt conveying mechanism (36) away from the lower conveying channel is higher than the height of the strip-shaped belt conveying mechanism (36) away from the upper conveying channel; and a belt width of each of the strip-shaped conveying belt branches is smaller than a width of each of the six longitudinal square grooves of each of the multi-groove bearing trays (10).

9. The apparatus for quality grading, sorting and conveying cucumbers according to claim 1, wherein both the chain rod conveying mechanism (37) and the strip-shaped belt conveying mechanism (36) independently control the conveying speed through an external Programmable Logic Controller (PLC) and a frequency converter, and in a conveying control process, a conveying speed of the strip-shaped belt conveying mechanism (36) is less than or equal to a conveying speed of the chain rod conveying mechanism (37).

10. A method of adopting the apparatus for quality grading, sorting and conveying cucumbers according to claims 1, comprising:

driving one of the multi-groove bearing trays (10) with the cucumbers (9) placed at the top by the chain rod conveying mechanism (37) to reach the strip-shaped belt conveying mechanism (36), wherein each of gaps between every two adjacent arc-shaped grooves of the plurality of arc-shaped grooves of each of the multi-groove bearing trays (10) is larger than a width of a corresponding one of the strip-shaped conveying belt branches, the one of the multi-groove bearing trays (10) overlaps with the strip-shaped belt conveying mechanism (36), and the cucumbers (9) placed at the top of the one of the multi-groove bearing trays (10) are higher than the strip-shaped conveying belt branches; and decreasing a distance between the cucumbers (9) placed at the top of the one the multi-groove bearing trays (10) and the strip-shaped conveying belt branches continuously until bottoms of the cucumbers (9) are in contact with the strip-shaped conveying belt branches when the one of the multi-groove bearing trays (10) is driven by an inclined channel of the chain rod conveying mechanism (37), transferring the cucumbers (9) from the multi-groove bearing trays (10) to the strip-shaped belt conveying mechanism (36), and driving the one of the multi-groove bearing trays (10) by the inclined conveying channel of the chain rod conveying mechanism (37) to be continuously lowered until the plurality of arc-shaped grooves and the strip-shaped conveying belt branches are separated from each other.

11. The apparatus for quality grading, sorting and conveying cucumbers according to claim 7, wherein the strip-shaped belt conveying mechanism (36) and the chain rod conveying mechanism (37) are kept in a parallel state, a height of the strip-shaped belt conveying mechanism (36) is higher than the lower conveying channel, the inclined conveying channel and the upper conveying channel of the chain rod conveying mechanism (37), and the height of the strip-shaped belt conveying mechanism (36) away from the lower conveying channel is higher than the height of the strip-shaped belt conveying mechanism (36) away from the upper conveying channel; and a belt width of each of the strip-shaped conveying belt branches is smaller than a width of each of the six longitudinal square grooves of each of the multi-groove bearing trays (10).

12. The method of adopting the apparatus for quality grading, sorting and conveying cucumbers according to 10, wherein each of the multi-groove bearing trays (10) is provided with seven bearing tray vertical plates (2), an arc-shaped groove is provided at a top of each of the seven bearing tray vertical plates (2), and seven arc-shaped grooves comprise a first arc-shaped groove (1), a second arc-shaped groove (3), a third arc-shaped groove (4), a fourth arc-shaped groove (5), a fifth arc-shaped groove (6), a sixth arc-shaped groove (7), and a seventh arc-shaped groove (8); six longitudinal square grooves formed between the seven bearing tray vertical plates comprise a first longitudinal square groove (14), a second longitudinal square groove (15), a third longitudinal square groove (16), a fourth longitudinal square groove (17), a fifth longitudinal square groove (18) and a sixth longitudinal square groove (19).

13. The method of adopting the apparatus for quality grading, sorting and conveying cucumbers according to 12, wherein the plurality of arc-shaped grooves are respectively located above the seven bearing tray vertical plates (2) and are distributed symmetrically on left and right; the first arc-shaped groove (1) and the seventh arc-shaped groove (8)

of each of the multi-groove bearing trays (10) have a same groove depth and a same groove width, the second arc-shaped groove (3) and the sixth arc-shaped groove (7) have a same groove depth and a same groove width, the third arc-shaped groove (4), the fourth arc-shaped groove (5) and the fifth arc-shaped groove (6) have a same groove depth and a same groove width, and widths of the plurality of arc-shaped grooves increase gradually from a middle to both sides of each of the multi-groove bearing trays except that the third arc-shaped groove (4), the fourth arc-shaped groove (5) and the fifth arc-shaped groove (6) have a same groove width.

14. The method of adopting the apparatus for quality grading, sorting and conveying cucumbers according to 12, wherein spacing between every two adjacent longitudinal square grooves of the six longitudinal square grooves are same; three inverted U-shaped grooves are provided at the bottom of each of the multi-groove bearing trays (10), which are a first inverted U-shaped groove (11), a second inverted U-shaped groove (12) and a third inverted U-shaped groove (13), and a direction of the inverted U-shaped grooves is perpendicular to a direction of the six longitudinal square grooves.

15. The method of adopting the apparatus for quality grading, sorting and conveying cucumbers according to 10, wherein the chain rod conveying mechanism (37) is provided with the chain rod conveying supporting shafts (22), chain rollers (38), chain inner plates (39), chain pins (40) and chain outer plates (41), a supporting frame (34) is mounted below the chain rod conveying mechanism, and a left protective shell (20) above the chain rod conveying mechanism and a right inclined protective shell (33) of the chain rod conveying mechanism and are mounted on a left side of the chain rod conveying mechanism, and a right protective shell (21) above the chain rod conveying mechanism and a right inclined protective shell (23) of the chain rod conveying mechanism are mounted on a right side of the chain rod conveying mechanism.

16. The method of adopting the apparatus for quality grading, sorting and conveying cucumbers according to 15, wherein each of the chain rod conveying supporting shafts (22) is connected with a corresponding one of the chain rollers (38), a corresponding one of the chain inner plates (39) and a corresponding one of the chain outer plate (41) via an inner sleeve;

each of the chain rod conveying supporting shafts (22) of the chain rod conveying mechanism (37) is a hollow round bar made of stainless steel, gaps between every two adjacent chain rod conveying supporting shafts of the chain rod conveying supporting shafts (22) are same, and the chain rod conveying supporting shafts (22) cooperate with the first inverted U-shaped groove (11), the second inverted U-shaped groove (12) and the third inverted U-shaped groove 13) of each of the multi-groove bearing trays (10) and fix the multi-groove bearing trays (10) above the chain rod conveying mechanism (37).

17. The method of adopting the apparatus for quality grading, sorting and conveying cucumbers according to 10, wherein the plurality of strip-shaped conveying belt branches of the strip-shaped belt conveying mechanism (36) comprise a first strip-shaped conveying belt branch (24), a second strip-shaped conveying belt branch (25), a third strip-shaped conveying belt branch (26), a fourth strip-shaped conveying belt branch (27), a fifth strip-shaped conveying belt branch (28) and a sixth strip-shaped conveying belt branch (29); and the first strip-shaped conveying belt branch (24), the second strip-shaped conveying belt branch (25), the third strip-shaped conveying belt branch (26), the fourth strip-shaped conveying belt branch (27), the fifth strip-shaped conveying belt branch (28) and the sixth strip-shaped conveying belt branch (29) have a same size and are evenly distributed.

18. The method of adopting the apparatus for quality grading, sorting and conveying cucumbers according to 12, wherein the strip-shaped belt conveying mechanism (36) and the chain rod conveying mechanism (37) are kept in a parallel state, a height of the strip-shaped belt conveying mechanism (36) is higher than the lower conveying channel, the inclined conveying channel and the upper conveying channel of the chain rod conveying mechanism (37), and the height of the strip-shaped belt conveying mechanism (36) away from the lower conveying channel is higher than the height of the strip-shaped belt conveying mechanism (36) away from the upper conveying channel; and a belt width of each of the strip-shaped conveying belt branches is smaller than a width of each of the six longitudinal square grooves of each of the multi-groove bearing trays (10).

19. The method of adopting the apparatus for quality grading, sorting and conveying cucumbers according to 10, wherein both the chain rod conveying mechanism (37) and the strip-shaped belt conveying mechanism (36) independently control the conveying speed through an external Programmable Logic Controller (PLC) and a frequency converter, and in a conveying control process, a conveying speed of the strip-shaped belt conveying mechanism (36) is less than or equal to a conveying speed of the chain rod conveying mechanism (37).

20. The method of adopting the apparatus for quality grading, sorting and conveying cucumbers according to 17, wherein the strip-shaped belt conveying mechanism (36) and the chain rod conveying mechanism (37) are kept in a parallel state, a height of the strip-shaped belt conveying mechanism (36) is higher than the lower conveying channel, the inclined conveying channel and the upper conveying channel of the chain rod conveying mechanism (37), and the height of the strip-shaped belt conveying mechanism (36) away from the lower conveying channel is higher than the height of the strip-shaped belt conveying mechanism (36) away from the upper conveying channel; and a belt width of each of the strip-shaped conveying belt branches is smaller than a width of each of the six longitudinal square grooves of each of the multi-groove bearing trays (10).

* * * * *